Feb. 27, 1951 W. L. BRIGGS 2,543,226
VEHICLE FENDER LIGHT
Filed Aug. 12, 1947
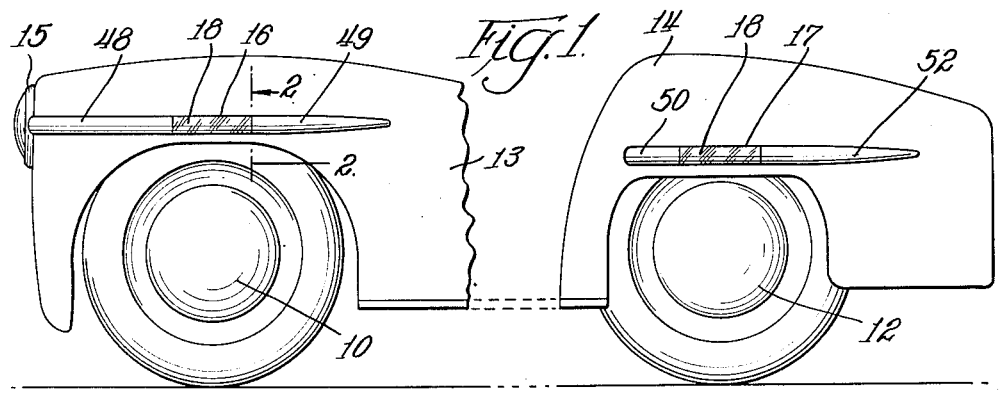
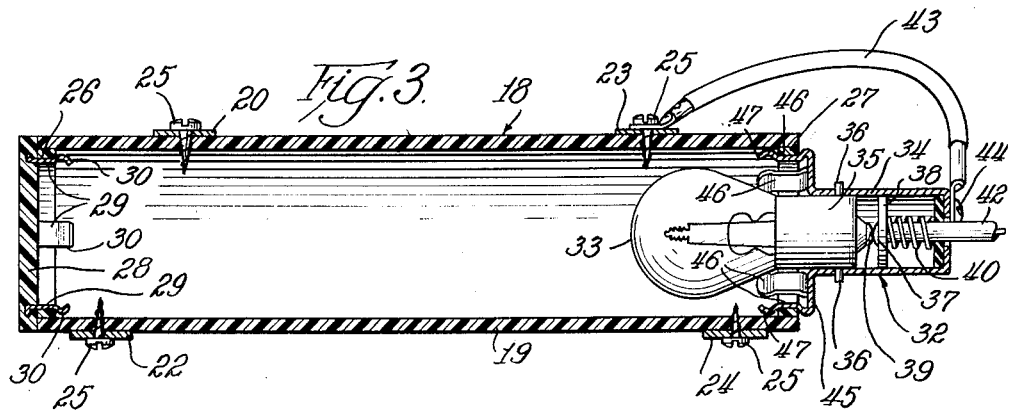
INVENTOR.
William L. Briggs
BY
Albert G. McCaleb
Atty Patented Feb. 27, 1951

2,543,226

UNITED STATES PATENT OFFICE 2,543,226

VEHICLE FENDER LIGHT

William L. Briggs, Chicago, Ill.

Application August 12, 1947, Serial No. 768,223

1 Claim. (Cl. 240—8.1)

This invention relates to vehicle fender lights of a type and construction which not only fit well into the present trends of streamlined design, but which are also rugged, easily serviced, conducive to safety and relatively inexpensive.

One of the objects of my invention is to provide a fender light adapted to mounting in a slot of appropriate size in a side wall portion of a fender and to fit flush with adjacent surfaces of an ornamental trim strip.

As another object, my invention contemplates the provision of a fender light unit suited to mounting in a slot in a vehicle fender with the major portion thereof inside the fender so as to present a relatively smooth outer appearance with the fender wall surface, said light being held in place by integral lugs on the interior of the fender.

My invention further contemplates the provision of a fender light of smoothly curved outer sectional shape and longitudinally contoured to align in flush relationship with two separated trim strips so as to effect a continuous appearance therewith, in addition to avoiding abruptly projecting external parts which might readily become damaged.

Other objects and advantages of the invention will be apparent from the following description and the accompanying drawings in which similar characters of reference indicate similar parts throughout the several views.

In the drawings:

Fig. 1 is a fragmentary side elevational view depicting the adaptation of a preferred form of my vehicle fender light to the fenders of an automobile;

Fig. 2 is an enlarged fragmentary sectional view showing details of the structure of the fender light illustrated in Fig. 1, and wherein the section is taken on the line 2—2 of Fig. 1; and Fig. 3 is a sectional view of the lamp unit shown in Fig. 2 wherein the section is taken substantially on the line 3—3 of Fig. 2.

Having reference to the exemplary embodiment of my invention which is shown for illustrative purposes in the accompanying drawings, Fig. 1 is a general view showing one preferred adaptation of the invention, while Figs. 2 and 3 illustrate details of the structure. In the adaptation shown in Fig. 1, a conventional type of passenger automobile is fragmentarily illustrated and includes front and rear wheels 10 and 12 respectively, shrouded front and rear fenders 13 and 14. As is presently customary, each front fender 13 carries a headlight 15.

Although it has previously been the practice to place parking and signal lights and the like on the top or end surfaces of one or both of the fenders, my present invention contemplates and has within its purview the provision of light units in the side surfaces of the fenders and combined with a trim strip. By this structure and arrangement of parts, the utility, safety and appearance are all served.

In the structural accomplishment of my arrangement, the front and rear fenders 13 and 14 are provided with side apertures or slots 16 and 17 respectively; the structural details of the slot 16 being depicted in detail in Fig. 2. The contour of the slots or apertures in each instance is adapted to conform to the outer surface of a light unit 18 which is mounted therein and exposed therethrough. In the present instance the light unit 18 comprises a cylindrical outer housing 19 which is mounted with the major portion thereof internally of the fender so that a substantially rectangular aperture conforms snugly to the lamp unit housing.

There are various ways in which the light unit might be held in place relative to the fender and aperture. In the present instance, and as shown in Figs. 2 and 3, lugs 20 and 22 are integrally formed on the fender and project inwardly thereof adjacent side edges of the aperture in somewhat staggered relationship and near one end of the aperture. Near the other end of the aperture, similar lugs 23 and 24 are formed to extend inwardly of the fender. In each instance, the lugs are shaped to fit around the cylindrical surface of the light housing 18 so as to act somewhat as opposed spring clips which permit insertion and removal of the light housing. In order to secure the light housing in place, fastening means such as screws 25 are utilized, and in each instance extend through a lug and are threaded into the light housing.

In the disclosed and preferred position, the axis of the cylindrical light housing is disposed in substantially parallel relationship to the general plane of the fender side wall and is displaced inwardly thereof so that the major portion of the light housing is inside of the fender and only a small portion projects outwardly in a lateral direction beyond the fender side wall. Thus, it may be readily understood that the light unit is placed and removed from the inside of the fender.

In my preferred construction, the cylindrical light housing 19 is desirably made of a transparent plastic material such as Lucite. At the ends of the housing 19, rings 26 and 27 are secured within the inner margin by an adhesive or by the application of heat thereto. These rings may be made of the same material as the housing. At one end an end cap 28 is utilized to close the cylindrical housing. The cap 28 is also desirably made of a plastic material such as Lucite and in the disclosed embodiment has resilient metal prongs 29 molded therein and projecting outwardly from one face. End portions 30 of the prongs are formed to snap over the ring 26 removably to hold the cap 28 in place.

At the other end of the light housing, a light socket unit 32 provides an end closure and carries an electric light bulb 33, which bulb provides the illumination for the light unit. The light socket unit 32 includes an outwardly projecting socket portion 34 adapted to receive and hold a conventional type of light bulb base 35, which, in the present instance, is provided with bayonet type holding prongs 36. Also within the socket portion 34 is a contact 37 supported for linear movement by disc 38 of insulating material and adapted to engage a center contact 39 of the light bulb. A compression spring 40 biases the contact 37 into engagement with the contact 39.

Electrical connections are made to the light bulb 33 in the conventional manner; one being through an insulated lead wire 42 to one side of the vehicle electric circuit and the other being grounded to the vehicle frame through a lead wire 43. In the present instance, one end of the lead wire is connected by fastening means such as a screw 44 to the end surface of the socket, and the other end is grounded to the vehicle body and frame by connection to one of the screws 25.

At the open end, the light socket unit is flared outwardly to provide an end closure flange 45 on the periphery of which are formed a plurality of projecting prongs 46. Each of the prongs 46 has a curved end portion 47 adapted to snap over and grip the inner surface of the ring 27, removably to hold the light socket unit in place relative to the light housing.

Since the light unit 18 desirably projects outwardly of the general plane of the fender side wall to some extent to improve the visibility of the light in various directions, it is desirable to provide protection for the light unit, particularly at the end surfaces thereof. In the present instance I provide such protection for the light unit and at the same time improve the appearance thereof by mounting convexly curved trip strips 48, 49, 50 and 52 adjacent the front and rear ends of the light units on two fenders as shown in Fig. 1. The general shape and contour of the trim strips is such that they not only conform to fender side wall surfaces, but also fit against the end surfaces of the light unit in flush relationship at the juncture of the light unit and the trim strips. The flush relationship and similarity of curvature of the trip strips and the light unit affords the desired protective feature and presents a continuously smooth surface.

In the daytime when the light unit is not used, the trim line is not materially interrupted and at night a portion thereof is illuminated by the light unit. Furthermore, and of greater structural importance, the smoothly curved contours and flush relationship of the trim strips and the light unit tend to prevent breakage by scuffing or the like. Such breakage is further prevented by having the light unit mounted mainly within and protected by the fender.

From the foregoing description and reference to the accompanying drawings it may be readily appreciated that I have provided a vehicle fender light unit and assembly which not only has advantageous structural and utilitarian features, but which may be manufactured and installed at low cost.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States is:

Means affording an automobile with both laterally and downwardly directed illumination from a substantially protected fender-carried lamp which comprises in combination a fender having a substantially vertically disposed wall portion to the outer surface of which is secured a pair of aligned horizontally disposed trim strips having circularly arcuate opposed end portions which are substantially spaced apart, that part of the aforementioned fender portion which lies between the opposed end portions of the trim strips being provided with a parallel sided horizontal slot, a lamp-containing light pervious lamp housing that is of substantially the same length as the fender slot and which has a diameter substantially greater than the width of said slot, the slot width and the lamp housing diameter and the chord and radius of each of the circularly arcuate opposed end portions of the trim strips being such that when said lamp housing is forced laterally as far as it will go into said slot from the inner side of said fender portion the cylindrical wall of said lamp housing lies immediately contiguous to and protrudes outwardly beyond the parallel upper and lower edges of the said slot and the outwardly protruding end portions of said lamp housing lie in contiguity and flush with the cylindrically arcuate opposed end portions of the trim strips, and members carried on the inner surface of such fender portion holding said lamp housing in the stated relationship to the said slot and the said trim strips while permitting light to be thrown downwardly from said housing and alongside the inner surface of said fender portion to the road.

WILLIAM L. BRIGGS.

REFERENCES CITED

The following references are of record in the file of this patent:

UNITED STATES PATENTS

| Number | Name | Date |
|---|---|---|
| 1,243,930 | Giroux | Oct. 23, 1917 |
| 1,415,984 | Brown | May 16, 1922 |
| 1,551,720 | Williamson | Sept. 1, 1925 |
| 1,574,982 | Lisher | Mar. 2, 1926 |
| 2,113,919 | Korematsu | Apr. 12, 1938 |
| 2,144,863 | Webber | Jan. 24, 1939 |
| 2,207,507 | Douglas | July 9, 1940 |
| 2,346,315 | Levy | Apr. 11, 1944 |
| 2,428,105 | Woodall | Sept. 30, 1947 |